United States Patent
Henriksen et al.

(10) Patent No.: US 6,702,994 B1
(45) Date of Patent: Mar. 9, 2004

(54) METHOD AND APPARATUS FOR PRODUCTION OF AMORPHOUS SILICA FROM SILICON AND SILICON CONTAINING MATERIALS

(75) Inventors: Knut Henriksen, Kristiansand (NO); Olaf Trygve Vegge, Kristiansand (NO)

(73) Assignee: Elkem ASA (NO)

(*) Notice: Subject to any disclaimer, the term of this patent is extended or adjusted under 35 U.S.C. 154(b) by 0 days.

(21) Appl. No.: 09/936,380

(22) PCT Filed: Mar. 22, 2000

(86) PCT No.: PCT/NO00/00099
§ 371 (c)(1),
(2), (4) Date: Sep. 7, 2001

(87) PCT Pub. No.: WO00/58214
PCT Pub. Date: Oct. 5, 2000

(30) Foreign Application Priority Data
Mar. 29, 1999 (NO) .......................................... 19991521

(51) Int. Cl.[7] .................................................. C01B 33/12
(52) U.S. Cl. ............................................................ 423/337
(58) Field of Search ................................. 423/335, 337

(56) References Cited

U.S. PATENT DOCUMENTS

| | | | |
|---|---|---|---|
| 2,626,874 A | * | 1/1953 | Pipkin ........................ 427/106 |
| 3,117,838 A | * | 1/1964 | Sterling et al. ............. 423/335 |
| 4,755,368 A | | 7/1988 | Ulrich et al. |
| 5,043,002 A | * | 8/1991 | Dobbins et al. ............... 65/386 |
| 5,152,819 A | * | 10/1992 | Blackwell et al. ............. 65/386 |
| 5,743,930 A | | 4/1998 | Miyake et al. |
| 5,979,185 A | * | 11/1999 | Blackwell et al. ............. 65/17.4 |
| 6,312,656 B1 | * | 11/2001 | Blackwell et al. .......... 423/337 |

FOREIGN PATENT DOCUMENTS

| | | |
|---|---|---|
| EP | 0151490 | 8/1985 |
| NO | 304366 | 6/1997 |

* cited by examiner

*Primary Examiner*—Wayne A. Langel
*Assistant Examiner*—William G. Wright, Sr.
(74) *Attorney, Agent, or Firm*—Muserlian, Lucas and Mercanti

(57) ABSTRACT

The present invention relates to a method for production of amorphous silica from particulate materials containing at least 50% elemental silicon, where the silicon-containing material is supplied to a combustion reactor which is heated by an oil- or gas burner and where amorphous silica is recovered after the outlet from the combustion reactor. At least a part of the particulate silicon containing materials are supplied to the combustion reactor in the form of an aqueous slurry. The invention further relates to an apparatus for production of amorphous silica.

10 Claims, 1 Drawing Sheet

METHOD AND APPARATUS FOR PRODUCTION OF AMORPHOUS SILICA FROM SILICON AND SILICON CONTAINING MATERIALS

FIELD OF THE INVENTION

The present invention relates to a method for producing amorphous silica from silicon and silicon-containing materials by flame combustion of silicon-containing materials with air, oxygen-enriched air or oxygen.

BACKGROUND OF THE INVENTION

Amorphous silica, having a small particle size and a high surface area, is today mainly produced by reacting volatile silicon compounds, particularly silicon tetrachloride with an oxygen-enriched gas in a flame. This product, which is called "fumed silica", has a number of applications, particularly as a filler in plastic and rubber. It is further known that similar amorphous silica products can be produces in plasma furnaces and electric furnaces where the reactants are quarts and carbon or silica and quarts. These products are, however, costly and have not found much use.

From EP-B-151490 and U.S. Pat. No. 4,755,368, there are known methods for flame combustion or silicon, where particulate silicon is fluidized in a gas, such as air or oxygen, and supplied to a reactor. The silicon is combusted in a flame to produce $SiO_2$ particles.

From Norwegian patent No. 304366, there is known a method for the production of amorphous silica from particulate silicon-containing materials, where particulate silicon is supplied in fluidized form to a combustion reactor using an oxygen-containing fluidizing gas and where additional oxygen-containing gas is supplied to the combustion reactor whereby the particulate silicon is burned to $SiO_2$ without the addition of further heat energy.

It is difficult to obtain an even and consistent process in the known methods for combustion of silicon powder to amorphous $SiO_2$. It is believed that a main reason for this is that it is difficult to obtain an even and constant supply of Si-powder to the reactor when the silicon powder is supplied to the reactor fluidized in a gas. Further, as can be seen from Norwegian patent No. 304366, only a specific surface area of about 20 $m^2$/g for the produced $SiO_2$ is obtained, while for many applications, amorphous silica is needed having a much higher surface area of 80 $m^2$/g or higher.

SUMMARY OF THE INVENTION

It is an object of the present invention to provide a method and an apparatus for the combustion of silicon-containing materials to amorphous $SiO_2$, whereby silicon is supplied to the combustion reactor in a very even and stable way and whereby amorphous silica is obtained having a surprisingly high specific surface area.

The present invention thus relates to a method for the production of amorphous silica from particulate materials containing at least 50% elemental silicon, where the silicon-containing material is supplied to a combustion reactor which is heated by an oil or gas burner, and where amorphous silica is recovered after the outlet from the combustion reactor. The method is characterized in that at least a part of the particulate silicon-containing materials are supplied to the combustion reactor in the form of an aqueous slurry.

According to a preferred embodiment, the silicon is supplied to the combustion reactor in the form of an aqueous slurry containing between 20 and 80% by weight silicon-containing material, and preferably between 40 and 60% by weight silicon-containing material.

According to another preferred embodiment, a viscosity regulating agent, such as a mineral acid or organic dispersing agents, are added to the aqueous slurry containing silicon-containing material.

In order to modify the surface of the produced amorphous silica, surface modifying agents can be added to the aqueous slurry, such as, salts of aluminum, preferably aluminum sulphate.

According to yet another embodiment, the amorphous silica is quenched by the addition of water in the area of the outlet from the combustion reactor.

It has surprisingly been found that by supplying silicon in the form of an aqueous slurry, a steady state operation in the reactor is obtained at the same time as the produced amorphous silica has a surprisingly high specific surface area of more than 100 $m^2$/g.

Any particulate material having a content of elemental silicon of at least 50% can be used as the silicon-containing material. Examples of such materials are metallurgical grade silicon in particulate form, high purity silicon in particulate form, atomized silicon, kerf from the sawing of silicon wafers for electronics and for solar cells, filter dust obtained from the crushing of silicon and residues from reactors for the production of organohalosilanes and inorganic silanes.

The present invention further relates to an apparatus for the production of amorphous silica from particulate materials containing at least 50% elemental silicon, the apparatus comprising an elongated reaction chamber having an oil or gas burner in one end, at least one opening arranged along the sidewall of the combustion reactor for the supply of silicon-containing material in the form of an aqueous slurry, an outlet opening for produced amorphous silica, and a means for collecting amorphous silica.

The combustion reactor preferably has an inlet opening for the supply of air, oxygen enriched air or oxygen.

DETAILED DESCRIPTION OF A PREFERRED EMBODIMENT

Figure 1:
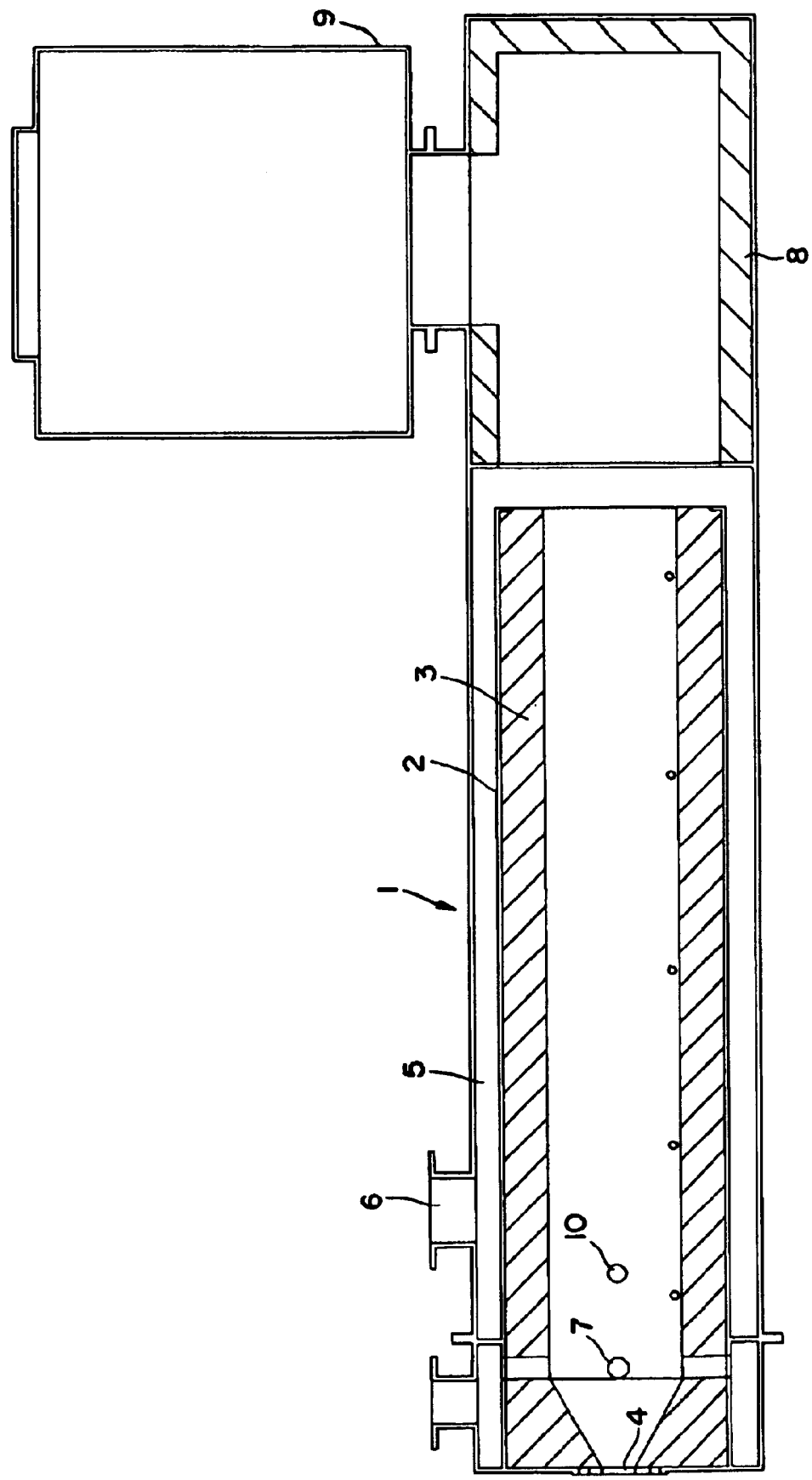
FIG. 1 shows a sectional view of the apparatus according to the invention.

In FIG. 1 there is shown a cylindrical shaped combustion reactor. The reactor 1 comprises an outer steel cylinder 2 having an inner refractory lining 3. One end of the reactor 1 has an oil or gas burner 4. In its other end the reactor 1 has an outlet opening. A cooling chamber 5 for circulating cooling air is arranged on the outside of the steel cylinder 2. The cooling chamber 5 has an inlet opening 6. The reactor 1 is further equipped with at least one inlet opening 7 for the supply of silicon-containing material in the form of an aqueous slurry.

The cooling air is supplied through the inlet opening 6 to the cooling chamber 5, and leaves the cooling chamber 5 into a chamber 8, which via an outlet 9 is connected to a filter or the like for collecting the produced amorphous silica. There is further arranged an inlet opening 10 for the supply of air, oxygen enriched air or oxygen to the reactor 1.

When starting the process, the reactor 1 is first heated by the oil or gas burner 4. Thereafter, the supply of silicon is started by the supply of an aqueous slurry containing silicon through the inlet opening 7 and the supply of air, oxygen enriched air or oxygen through the opening 10. The silicon particles which enter the reactor will ignite and be burned to amorphous silica as they pass through the reactor 1.

EXAMPLE 1

Silicon dust collected from a plant for crushing metallurgical grade silicon was mixed with water to a slurry containing 60% by weight of silicon. The slurry was supplied to a reactor as shown in FIG. 1 after the reactor had been heated to a temperature of about 1550° C. at the inlet end of the reactor. The slurry was pumped into the inlet opening 7 of the reactor in an amount of 0.2 kg per. minute together with 500 liters of oxygen per. minute. The produced amorphous silica was collected in a filter unit connected to the outlet opening 9 in the chamber 8.

The specific surface area of the amorphous silica was measured by DIN 66132 (BET one point measurement). The produced amorphous silica had a specific surface area of 114.2 $m^2/g$.

The amorphous silica was examined in order to measure the content of crystalline silica using a Philip PW1710 x-ray diffraction apparatus having a copper anode in the x-ray tube. No crystalline silica was found.

EXAMPLE 2

The test in Example 1 was repeated, except that 0.4 kg per. minute was supplied to the reactor. The produced amorphous silica had a specific surface area of 213.6 $m^2/g$.

EXAMPLE 3

The test in Example 1 was repeated, except that a slurry containing 50% by weight silicon was used. The produced amorphous silica had a specific surface area of 117.9 $m^2/g$.

EXAMPLE 4

The test in Example 1 was repeated, except that the silicon-containing material used was kerf from diamond cutting of silicon wafers for solar cells which had been subjected to milling in 15 minutes in a ball mill. The produced amorphous silica had a specific surface area of 103.2 $m^2/g$.

Examples 1–4 show that by the method according to the present invention, amorphous silica is obtained having a very high specific surface area when compared to the amorphous silica produced according to Norwegian patent No. 304366.

What is claimed is:

1. A method for production of amorphous silica from particulate materials containing at least 50% by weight elemental silicon, where the silicon-containing material is supplied to a combustion reactor which is heated by an oil or gas burner and where amorphous silica is recovered after the outlet from the combustion reactor, characterized in that at least a part of the particulate silicon containing materials are supplied to the combustion reactor in the form of an aqueous slurry.

2. Method according to claim 1, characterized in that the silicon is supplied to the combustion reactor in the form of an aqueous slurry containing between 20 and 80% by weight of silicon-containing material.

3. Method according to claim 1, characterized in that a viscosity regulating agent is added to the aqueous slurry containing silicon-containing material.

4. Method according to claim 1, characterized in that surface modifying agents is added to the aqueous slurry.

5. Method according to claim 1, characterized in that the amorphous silica is quenched by addition of water in the area of the outlet from the combustion reactor.

6. Method according to claim 2, characterized in that the silicon is supplied to the combustion reactor in the form of an aqueous slurry containing between 40 and 60% by weight of silicon-containing material.

7. Method according to claim 3, characterized in that a mineral acid is added to the aqueous slurry.

8. Method according to claim 3, characterized in that the organic dispersion agents are added to the aqueous slurry.

9. Method according to claim 4, characterized in that salts of aluminum is added as a surface modifying agent.

10. Method according to claim 9, characterized in that aluminum sulphate is added as a surface modifying agent.

* * * * *